Patented Aug. 14, 1945

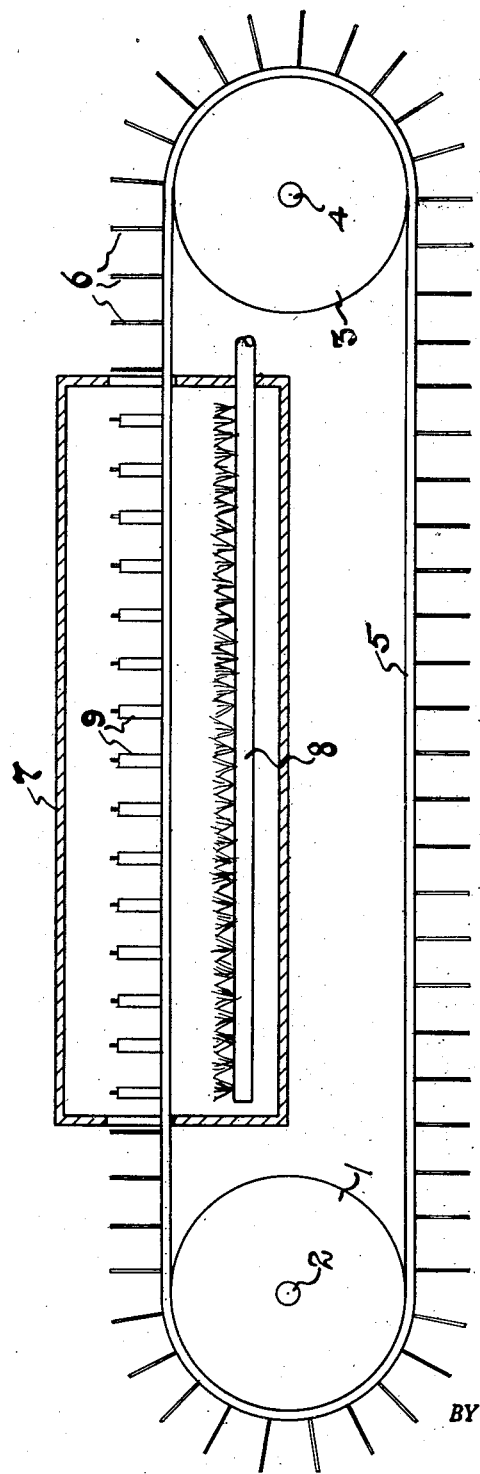

2,382,136

UNITED STATES PATENT OFFICE 2,382,136

CERAMIC BODIES AND METHOD OF PRODUCING SAME

Henry L. Crowley, South Orange, and Arthur M. Hossenlopp, Metuchen, N. J., assignors to Henry L. Crowley & Company, Inc., West Orange, N. J., a corporation of New Jersey Application March 13, 1943, Serial No. 479,050

2 Claims. (Cl. 106—46)

This invention is concerned with methods of preparing, forming, and firing ceramic bodies, as well as the products produced thereby.

One object of this invention is to provide compositions for ceramic bodies which are capable of being fired at temperatures lower than those heretofore required, as for example at temperatures not higher than 2100 degrees F., and which may be fired in much shorter periods of time than now commonly required.

Another object of this invention is to provide novel ceramic compositions containing plasticized binders which during firing are volatilized without deterioration of the bodies and with the formation of a minimum amount of residual carbon.

Another object of this invention is to provide an improved method of controlling the density of ceramic bodies so as to minimize shrinkage during firing.

Another object of this invention is to provide ceramic body mixtures which approach a dry condition and yet which have such plasticity that they flow substantially as fluids under pressure.

A still further object of this invention is to provide a method of firing ceramic bodies while holding them so as to prevent sagging and deformation.

A further object of this invention is to provide ceramic body mixtures from which complicated forms and shapes may be molded by simple pressing operations into bodies of substantially uniform density.

Another object of this invention is to provide ceramic body mixtures which are capable of being molded by cold injection molding into final form.

These and other objects as will appear from the following disclosure are secured by means of the novel subject matter herein disclosed.

This invention resides substantially in the steps, series of steps and products, all as hereinafter disclosed.

In the accompanying drawing the single figure is a diagrammatic illustration of one method of firing ceramic bodies produced in accordance with the subject matter herein disclosed.

In the art of producing ceramic bodies for use in high frequency electrical apparatus, as well as for many other uses, numerous difficulties are encountered and limitations exist which make the ceramic art difficult and expensive to practice. It may be stated as a general object of this invention to eliminate many of these difficulties, simplify the procedure of fabrication, and reduce the cost of manufacture. Heretofore vitrified or non-porous ceramic bodies have required a firing temperature of 2350 degrees F. and higher for non-steatite products and 2500 degrees F. and higher for steatite products. One result is that it has therefore been impossible to fire such bodies while in contact with ordinary metals or other ceramic supports. It has been necessary, therefore, to carry such bodies in silicon carbide or corundum trays during firing, although molybdenum or tungsten trays can be used in a very carefully controlled hydrogen atmosphere. In accordance with this invention ceramic bodies are produced which may be fired at temperatures not higher than 2100 degrees F. and preferably at 2050 degrees F., at which temperatures these bodies may be supported on endless metal belts, or the like, by which they are carried through the furnace. For example, in the case of tubes they may be supported on pins forming part of an endless belt or carrier arranged to travel through the furnace during firing. At such temperatures there is no tendency for the ceramic to fuse to the metal support.

A further development of this invention involves a substantial reduction in the firing time required because of the nature of the ceramic body mixtures employed. In accordance with present practice the very shortest firing time possible of ceramic bodies of the type under discussion is approximately fifteen hours, running in some cases to twenty-four hours and longer. In addition to the expense thus involved these long firing times cause excessive shrinkage of the bodies, making it difficult to hold the products within desired dimensional limits. In accordance with this invention it is possible to fire the ceramics for periods as short as twenty minutes at temperatures of 2100 degrees F. or lower, thereby effecting a very substantial reduction in processing time, and at the same time insuring closer control over dimensional size by a substantial reduction in shrinkage of the bodies during firing. It likewise follows that these shorter periods of treatment are less destructive of the metal carriers or supports used to carry the ceramic bodies during the heat treatment.

The best ceramic bodies heretofore produced have a Q factor (reciprocal of the power factor in percentage) which is about one-third of that of the bodies of this invention. Thus ceramic bodies of this invention have been produced having a Q of 950 and better, which is an important attribute for materials of this type used in high frequency electrical apparatus.

The composition of this invention consists basically of magnesium silicate (talc), clay, a flux, a binder, and a plasticizer. The fluxes may consist of any of the available alkaline earth metal compounds, as for example beryllia, baria, strontia, calcia, calcium carbonate, barium carbonate, and the like, as well as mixtures thereof. As a general proposition fluxes are selected which are compounds of the metals of the first four groups of the periodic table whose position in that table according to atomic weight is less than that shown by a diagonal on the table chart running from a point equivalent to nitrogen in group 5 to a point equivalent to gold in group 1.

Suitable binders for the purpose are resinous binders such as phenol formaldehyde thoroughly plasticized with a suitable plasticizer such as thalates, dibutyl thalate, thallic acid, glycols, phosphates, such as tricresyl phosphate and the like, from 15 to 0.5 percent by weight of resinous binder (preferably 2%) may be employed, to which is added from 0.5 to 1 percent by weight of a plasticizer such as tricresyl phosphate which may be incorporated into the mixture by dissolving it in about 1 to 2% by weight of the mixture (1 pint to 2 pints per 100 lbs.) of a suitable solvent such as acetone, alcohol, benzol, for example, and mixtures thereof.

Other binders in accordance with this invention are the higher alcohols, glycerols, such as glycerine, and glycol, amines such as triethanolamine, soap-like materials such as stearic acid which will readily volatilize during firing, carbo wax, carbitol, ether or diethylene glycol, and the like.

The talc, clay and flux ingredients of the mixture are preferably reduced to ultra-fine particles having a size of from 0.1 to 4 microns, but preferably of sizes less than 1 micron. The subdivision of the particles is effected by carrying them at high velocity in a stream of gas such as air or steam through a suitably constructed mill or channel so that the particles will impinge upon each other and thereby be ground down to these extremely small sizes. An important advantage of using these extremely small particles is that the bodies formed are of substantially uniform density and constituency throughout with a minimum of porosity which reduces the influence of humidity on them, and which is probably one of the contributing factors to the production of such high Q factors. Ceramic bodies of this type, after firing, may be visualized as composed of a multitude of extremely fine talc particles each enclosed within a glassy envelope composed of the fluxing material. In other words, it is a matrix of talc particles each individually surrounded by these glassy envelopes to produce a body acting under electrical influence in a manner analogous to a condenser.

These ingredients are compounded into a mixture of the desired plasticity and adhesiveness in which the binders employed will readily volatilize at the lower temperatures mentioned above with the formation of but little carbon which is quickly burned out. A suitable mixture in accordance with this invention consists in parts by weight

| | Parts |
|---|---|
| Talc | 66 |
| Clay | 10 |
| Calcium carbonate | 1 |
| Barium carbonate | 22 |
| Berylium oxide | 1 |
| Phenol formaldehyde | 2 |
| Tricresyl phosphate | 1 |

The solvent for this mixture comprises one to two pints per hundred pounds of the mixture of acetone, alcohol or benzol, or mixtures of any two or three thereof.

The plasticizer, as stated above, is preferably dissolved in a small quantity of solvent, the amount of which will depend upon how dry the mixture can be and yet be worked. A suitable quantity of solvent is about 1 to 2% of the mixture by weight. Such a mixture may be pressed into suitable forms such as tubes, plates, and the like, which even before firing are sufficiently sustaining so that holes and other apertures may be punched thereinto. These mixtures are capable of being formed in simple presses having a single ram (as distinguished in accordance with prior practice from multiple ram presses), wherein complicated shapes of uniform density may be formed.

Referring to the drawing a simple shape is illustrated as comprising a cylindrical body 9 having an axial aperture extending therethrough. These bodies may be fired by mounting them on pins 6 supported by an endless belt 5 passing around suitably driven pulleys or wheels 1 and 3 which are supported on axles 2 and 4 respectively. A suitably constructed firing furnace 7 is positioned so that the top flight of the conveyor may travel endwise therethrough. Any suitable form of heat generating means may be employed, as for example the gas burner 8. The rate of movement of the belt is, of course, in part determined by the size of the bodies to be fired. Obviously it will move at such a rate that each body will remain in the furnace for a sufficient period of time to complete the firing thereof by the volatilization of the binder and the fusing of the flux or fluxes. As previously mentioned, for simple not too massive bodies, this firing may be accomplished at 2100 degrees F. and lower in approximately twenty minutes.

Because of the shortness of time involved in firing it is possible to exercise a control over the entire operation not heretofore possible in any feasible manner because of the long firing time required. At the end of about twenty minutes the first fired body issues from the furnace, which may be easily measured to determine the deviation of its dimensions from the desired sizes as caused by shrinkage. If excess shrinkage has occurred it is then possible in the molding of the subsequent bodies to control the amount of material going into each body and the density thereof by variation of the pressures applied in forming them so as to insure the subsequent finished bodies shrinking to the desired dimensions.

As will be apparent in the case of some bodies such as those illustrated in the drawing, deformation thereof during firing is prevented by supporting them on or in suitable fixtures which insure that whatever shrinkage occurs, it will be uniform to maintain the cylindrical form of the bodies and to prevent longitudinal sagging thereof.

Another important characteristic of the mixture of this invention is its quality of acting hydraulically, that is flowing as a fluid under pressure due to the use of the plasticizer. By reason of this quality it is particularly easy to mold quite complicated bodies having projections and other surface formations throughout all parts of which it is possible to attain substantially uniform density. Heretofore to accomplish the molding of complicated shapes it has been necessary to use rather wet mixtures containing from 6 to 17 percent fluids, as well as compound rams in the presses in order to form them. Even then uniform density throughout the bodies could not be secured. As a result of this during firing excess and non-uniform shrinkage resulted to an extent which required many rejects. In accordance with this invention the mixtures are quite dry and yet they flow in accordance with hydraulic principles, insuring rapid firing, minimum but uniform shrinkage, and uniform density. Likewise, the processes required are thereby simplified and their useful life increased.

Shrinkage can be further minimized by prefiring of the ceramic body but not to a sufficient extent to cause fusing of the fluxes. These bodies are then reground, preferably using the turbo flow principles mentioned above for reincorporation into fresh mixtures to again be molded and finally fired in accordance with the methods defined above. It is, of course, obvious in this case that the initial molding need not take any particular body shape. Prefiring thus contributes to a reduction in shrinkage along with the reduction in the amount of binder used, the use of a plasticizer and ultrafine grinding, as previously described.

In the production of fired ceramic bodies shrinking is inevitable and in accordance with prior methods the shrinking of such bodies has been of the order of 8 to 20% and sometimes more. Likewise an extremely difficult problem to handle arises from the fact that as between a plurality of bodies of the same mixture and under the same firing conditions the shrinkage has not been uniform so that it could not be allowed for in advance. The result is that wide and non-uniform dimensional errors have resulted which have frequently been disastrous in cases where the finished parts were required to be held within rather close tolerances. Of course, if no shrinkage at all takes place the sole determining factor of the finished sizes of the article would be the die size, but since shrinkage always occurs under these conditions the molded products before firing must be made oversized. As a result of the improvements taught herein it is possible to limit the shrinkage to no more than 1½% and more importantly to greatly improve the uniformity of shrinkage whereby the die oversizes can be greatly reduced, the final product held to close tolerances and the uniformity of the resulting product greatly improved. This reduction to a shrinkage of 1½% results when prefiring and regrinding are employed, but even when not employed uniformity of shrinkage and a considerable reduction in shrinkage from prior art practices is accomplished.

Because of the qualities already mentioned of the mixtures they are capable of being formed into bodies by cold injection into molds or dies to form even complicated body forms such as threaded coil forms with or without holes formed therein either axially or radially. The mixtures in this case preferably use a percentage of binder such as a resinous binder of the order of 3% and about 0.5% of plasticizer dissolved in about 4% of a suitable solvent, by weight, based upon 100% for the body. In this case additional ingredients may be employed such as sugar, dextrose, and dextrine, or mixtures thereof as binders; emulsions made of water and waxes or oil, or mixtures thereof with tri-ethanolamine and stearic acid as plasticizers; and suitable solvents such as acetone, alcohol, benzol and the like.

In accordance with another object of this invention the density of the body may be controlled by varying the non-ceramic content of the batch by changing the pressure applied during the molding or formation of the body and by varying the time and temperature of firing. By means of these variables it is possible to produce ceramic bodies of desired density within a relatively wide range.

It will be apparent to those skilled in the art that the subject matter of this invention is capable of substantial variation as indicated by the scope of the disclosure herein. However, the scope of this invention has been defined in the claims when interpreted in accordance with the established principles of equivalency.

What is claimed is:

1. A method of forming a ceramic from a mixture of talc, clay, a flux, a binder and a plasticizer dissolved in a suitable solvent therefor, which comprises molding the mixture into a body, prefiring the body at a temperature below the fusing point of the flux, regrinding the body, mixing the reground particles with a binder and a plasticizer dissolved in a suitable solvent therefor, molding the mixture to desired shape, and firing the body at a temperature not greater than 2100 degrees Fahrenheit.

2. In the method of claim 1, limiting the firing time to no more than one hour.

HENRY L. CROWLEY.
ARTHUR M. HOSSENLOPP.